United States Patent
Masson et al.

(10) Patent No.: US 8,980,032 B2
(45) Date of Patent: Mar. 17, 2015

(54) METHOD FOR MANUFACTURING AN ARM IN COMPOSITE MATERIAL COMPRISING A TRANSVERSAL BEARING DESIGNED TO RECEIVE A FIXED OR ROTATING SHAFT

(75) Inventors: Richard Masson, Les Loges en Josas (FR); Patrick Dunleavy, Palaiseau (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 267 days.

(21) Appl. No.: 13/637,291

(22) PCT Filed: Mar. 24, 2011

(86) PCT No.: PCT/EP2011/001478
§ 371 (c)(1),
(2), (4) Date: Jan. 10, 2013

(87) PCT Pub. No.: WO2011/116966
PCT Pub. Date: Sep. 29, 2011

(65) Prior Publication Data
US 2013/0098539 A1    Apr. 25, 2013

(30) Foreign Application Priority Data
Mar. 26, 2010  (FR) ..................................... 10 52232

(51) Int. Cl.
| | |
|---|---|
| *B29C 70/24* | (2006.01) |
| *B29C 70/48* | (2006.01) |
| *B29C 70/86* | (2006.01) |
| *F01L 1/18* | (2006.01) |
| *B29C 70/22* | (2006.01) |
| *B29C 70/54* | (2006.01) |
| *D04C 3/48* | (2006.01) |
| *F16C 7/02* | (2006.01) |
| *B29L 31/06* | (2006.01) |

(52) U.S. Cl.
CPC . *F01L 1/18* (2013.01); *B29C 70/24* (2013.01); *B29C 70/222* (2013.01); *B29C 70/48* (2013.01);
CPC ....... *B29C 70/545* (2013.01); *B29C 70/86* (2013.01); *D04C 3/48* (2013.01); *F16C 7/026* (2013.01); *B60G 2206/7101* (2013.01); *B29L 2031/06* (2013.01)
USPC .......................................... 156/148; 156/172

(58) Field of Classification Search
CPC .... B29C 70/222; B29C 70/48; B29C 70/545; B29C 70/86; B29C 70/865; B29C 70/24; B29L 2031/06; D04C 3/48; F16C 7/026; B60G 2206/7101
USPC .......................................... 156/148, 149, 172
See application file for complete search history.

(56) References Cited

U.S. PATENT DOCUMENTS

| | | | |
|---|---|---|---|
| 4,992,313 | A | 2/1991 | Shobert et al. |
| 8,801,992 | B2 * | 8/2014 | Dunleavy et al. ............. 264/259 |
| 2007/0152105 | A1 * | 7/2007 | Filsinger et al. ............. 244/213 |

FOREIGN PATENT DOCUMENTS

| | | | |
|---|---|---|---|
| CH | 652176 | A5 | 10/1985 |
| EP | 0283974 | A2 | 9/1988 |
| EP | 1798428 | A1 | 6/2007 |
| WO | WO 2009/153220 | A1 * | 12/2009 |

OTHER PUBLICATIONS

"Assembly: The Best Assembly Is No Assembly Required" In: F. C. Campbell: "Manufacturing processes for advanced composites", 2004, Elsevier, Oxford, UK, XP002613994, ISBN: 1856174158 pp. 439-470.

* cited by examiner

*Primary Examiner* — Michael Tolin
(74) *Attorney, Agent, or Firm* — Sughrue Mion, PLLC

(57) ABSTRACT

The invention relates to a method for manufacturing an arm (16) in composite material, this arm comprising a main body incorporating a bearing (22) designed to receive a shaft passing through it transversely, this method comprising the steps of:
- manufacturing a hub (11) by winding reinforcing fibers around a generally tubular support (12);
- manufacturing at least one sleeve (14);
- attaching the hub (11) to one end of the sleeve (14) and transversely to the sleeve (14) in order to form a mandrel;
- applying one or more layers of braided reinforcing fibers (21) around this mandrel with a machine for braiding reinforcing fibers (19);
- injecting and polymerizing resin into the layer or layers of braided fibers (21).

The invention applies notably to an arm forming an undercarriage rocker arm of an aircraft.

8 Claims, 2 Drawing Sheets

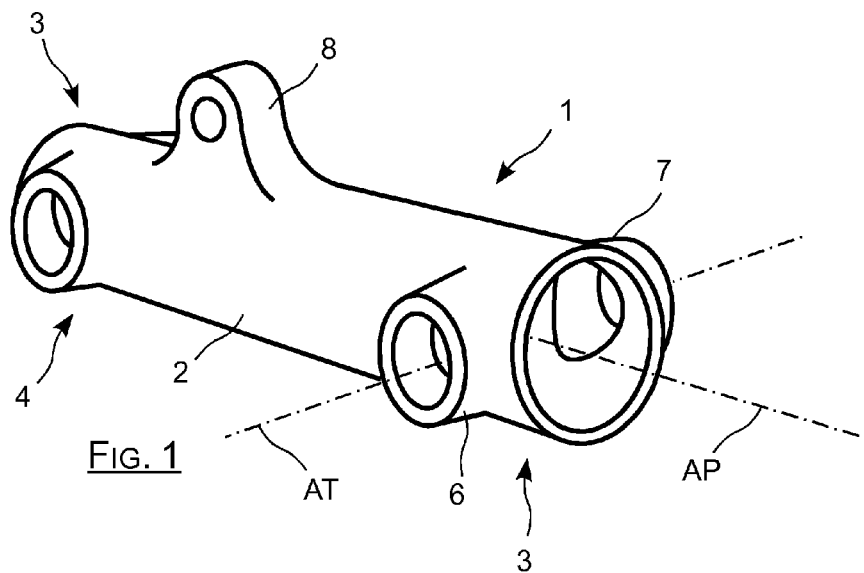
FIG. 1
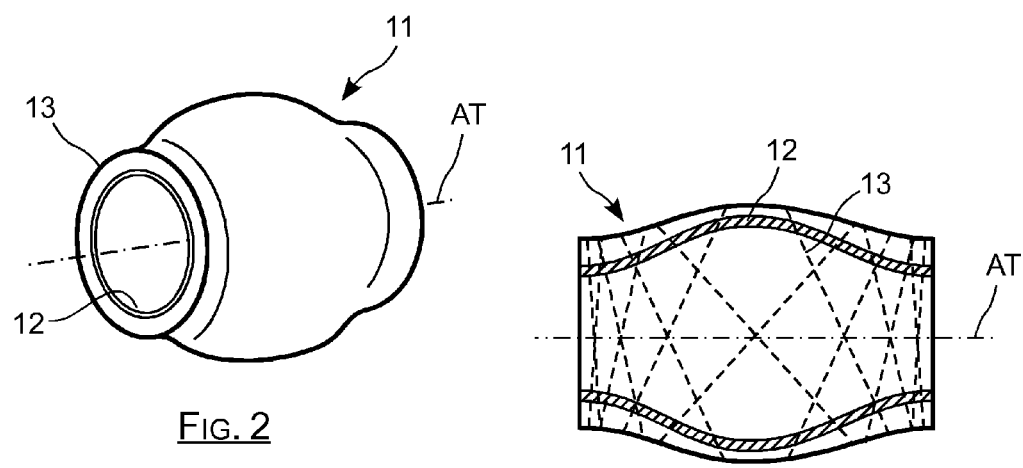
FIG. 2
FIG. 3
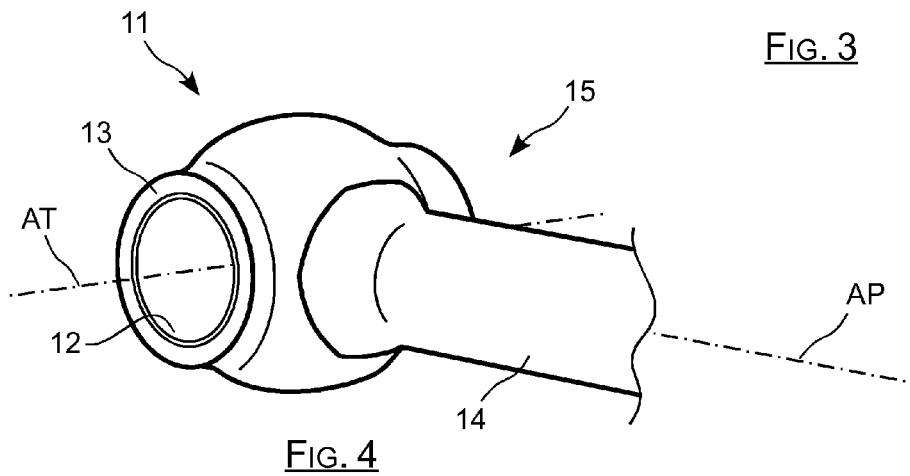
FIG. 4

METHOD FOR MANUFACTURING AN ARM IN COMPOSITE MATERIAL COMPRISING A TRANSVERSAL BEARING DESIGNED TO RECEIVE A FIXED OR ROTATING SHAFT

CROSS REFERENCE TO RELATED APPLICATIONS

This application is a National Stage of International Application No. PCT/EP2011/001478, filed on Mar. 24, 2011, which claims priority from French Patent Application No. 10 52232, filed on Mar. 26, 2010, the contents of all of which are incorporated herein by reference in their entirety.

The invention relates to an arm forming a structural element of an aircraft undercarriage, such as a rocker arm, that is to say comprising a main body incorporating a bearing designed to receive a rotating shaft, or a fixed shaft forming an axle, oriented transversely relative to the main direction of this main body.

BACKGROUND OF THE INVENTION

A known undercarriage rocker arm that is shown schematically in FIG. 1 indicated by reference numeral 1 takes the form of a tubular part or an arm extending in a main direction indicated by AP.

This arm comprises a main portion 2 extending between two ends 3 and 4 and having a circular section that is approximately constant in its central region.

As can be seen in FIG. 1, the front end 3 of this arm is designed to receive a shaft oriented transversely in the direction AT that is in this instance perpendicular to the direction AP. This end therefore forms a portion forming an interface or bearing formed in two bosses protruding transversely from the outer face of the main body 2.

Each boss is pierced and bored in the direction AT, so as to form the two bearing surfaces of the bearing in order to engage a mechanical shaft passing transversely through the main body of the arm.

Similarly, the rear end also comprises an interface forming a generally similar bearing which is designed to receive another transverse shaft not shown. In addition, this rocker arm also comprises an intermediate crevice 8 situated between its two ends and protruding radially from the outer face of the main body.

Because of the complex shape of the bearings of such a rocker arm that can be seen in FIG. 1 and because of the considerable mechanical strength that is expected of it, the whole rocker arm is usually manufactured of high strength steel by machining.

The bosses 6 and 7 in which the bearings are made are determinant in that they constitute local extra thicknesses of material, which is indispensible for ensuring that the forces applied by the mechanical shaft on the rocker arm body do not give rise to concentrations of stresses that are too great in the rocker arm.

Therefore, in general, the structural elements of the rocker arm or a similar type require the production of extra thicknesses of material at their interfaces with other parts in order to limit the phenomenon of stress concentration that is likely to cause incipient cracks.

In the case of an undercarriage rocker arm like that of FIG. 1, each bearing receives a shaft that is in fact attached relative to the rocker arm and that forms an axle carrying for example two wheels situated on either side of this rocker arm.

The problem that arises is similar in the case of an arm comprising a bearing receiving a rotary shaft, because the question of concentration of stresses at the bearing remains determinant with respect to the dimensioning of such an arm.

OBJECT OF THE INVENTION

The object of the invention is to propose a solution for manufacturing in composite material an arm comprising a bearing designed to receive a mechanical shaft passing through this arm transversely.

SUMMARY OF THE INVENTION

Accordingly, the subject of the invention is a method for manufacturing an arm in composite material comprising at least one bearing designed to receive a fixed or rotating shaft passing through the arm transversely, this method comprising the steps of:
  manufacturing at least one hub by winding reinforcing fibres around a generally tubular support;
  manufacturing at least one sleeve;
  manufacturing a mandrel by attaching each hub to at least one sleeve end so that each hub extends transversely to each sleeve;
  applying one or more layers of braided reinforcing fibres around this mandrel and over its whole length with a machine for braiding reinforcing fibres;
  injecting and polymerizing resin into the layer or layers of braided fibres and optionally into the wound fibre or fibres of the hub in order to establish a cohesion rigidly binding at least the layers of braided fibres with the hub that they surround;
  machining the layers of braided reinforcing fibres at each end of the generally tubular support in order to clear each end of this support.

With this solution, the wound hub makes it possible to produce an extra thickness of material that is sufficient to limit the concentrations of stresses in the zones of absorbing forces, and to obtain an optimal cohesion between the body of the arm formed by these layers and the hub.

The invention also relates to a method as defined above in which each sleeve is manufactured with pieces of fabric of reinforcing fibres preimpregnated with resin, in which the reinforcing fibres wound around the generally tubular support are also preimpregnated with resin, and in which the mandrel is prepolymerized before application of the layers of braided reinforcing fibres.

The invention also relates to a method as defined above in which the reinforcing fibres are wound around the generally tubular support so as to form a hub having a generally spherical outer shape.

The invention also relates to a method as defined above in which the generally tubular support has a larger section in its central portion than at its ends.

The invention also relates to a method as defined above in which each sleeve end is attached to the hub by bonding.

The invention also relates to a method as defined above, in which each sleeve has an end having a flared shape in order to closely follow the outer shape of the hub to which this end is attached.

The invention also relates to a method as defined above, in which the hub is situated at one end of the mandrel.

The invention also relates to a method as described above in which the mandrel is manufactured by assembling to the hub two sleeves extending on either side of the hub.

BRIEF DESCRIPTION OF THE FIGURES

FIG. 1 is an overview in perspective of a known rocker arm manufactured in high-strength steel;

FIG. 2 is a view showing in perspective a wound hub according to the invention shown on its own;

FIG. 3 is a view in section of the wound hub according to the invention shown on its own;

FIG. 4 is a view in perspective showing an end of the mandrel manufactured according to the invention;

DETAILED DESCRIPTION OF THE INVENTION

Figure 5:
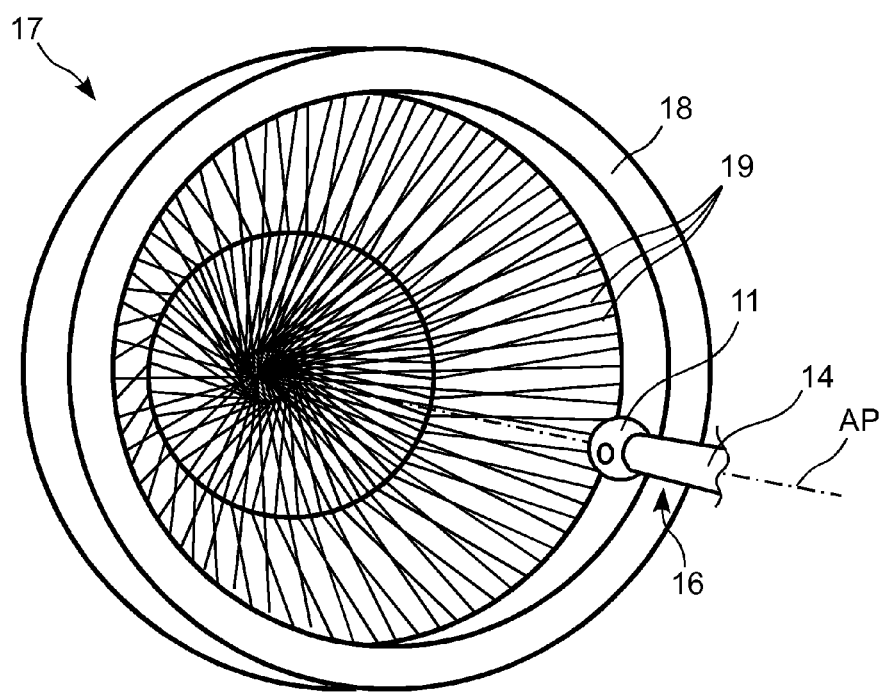
FIG. 5 is a view in perspective illustrating schematically a braiding machine.

The basic idea of the invention is to manufacture a hub by winding so as to form an extra thickness of composite material at the interfaces of the future part, to assemble each hub to a sleeve in order to form a mandrel about which layers of braided fibres are subsequently applied. The layers of reinforcing fibres are thus rigidly secured to the hub after injection and polymerization of resin in these layers and at the junction of these layers with the hub.

The hub, which is shown on its own in FIG. 2, indicated by reference numeral 11, is manufactured from a generally tubular support 12, extending along an axis marked in this instance AT, about which reinforcing fibres are wound.

The fibres may take the form of strands, the form of a strip of woven fibres, or another form and they may be impregnated with resin or not impregnated. They are wound about the outer face of the support 12 so as to form a hub having a generally spherical outer shape in the middle of the hub.

This can be obtained with a support 12 formed by a portion of tube of constant section, by winding a greater quantity of fibres around the central region of this tube than around its ends.

But the generally tubular support 12 may also have a changing section which is greater in its central region than at its ends, as illustrated in FIG. 3, in which the support 12 has in its central region an approximately spherical outer shape.

The winding of the fibres 13 can then be optimized to have a greater thickness at the ends of the tube because they are subjected to the highest stresses in operation, and have a lesser thickness in the central region which is less highly stressed from the mechanical point of view.

As shown schematically in FIG. 3, it is possible to obtain a thickness of fibres that differs from one region to the other along the axis AT of the tube, by modifying the angle of winding of the fibres 13 during the winding operation. Thus, in the example of FIG. 3, the angle of winding is small at the ends in order to form a considerable thickness, and it is great in the central region in order to form a lesser fibre thickness.

This can be obtained both when the fibres take the form of a directly wound strand, and when these fibres take the form of a woven ribbon or a strip that is then wound around the support 12.

Thus, as can be seen in FIG. 2, the hub 11 formed by the tube and the reinforcing fibres that surround it, indicated here by reference numeral 13, has a general shape approaching that of a sphere traversed by a hole which is delimited by the inner face of the tube 12.

This hub corresponds to the body of the bearing or diffusing element incorporated into the arm, and it forms the extra thickness of material making it possible to limit the effect of stress concentration induced by the forces that are applied to the arm by the mechanical shaft passing through the bearing.

The tube 12 is for example manufactured with reinforcing fibres taking the form of a fabric preimpregnated with resin, which is applied to a cylindrical part so as to form the tube shape. The tube thus formed is prepolymerized so as to give it a sufficient rigidity to be manipulated and to wind the reinforcing fibres 13.

As shown in FIG. 4, the hub 11 is then attached to one end of a sleeve 14 so that the tube 12 of the hub extends transversely to this sleeve 14, this assembly being produced by bonding with resin.

This operation can be carried out with an autoclave, for example in two portions, delimiting an inner shape corresponding to the outer shape of the mandrel. The operation then consists in applying, in the semicylindrical region of the autoclave, layers of fabric of preimpregnated reinforcing fibres in order to form the sleeve.

The hub 11 is then installed in the corresponding recess of the autoclave, adhesive then being able to be placed in the zones of junction in order to ensure a bonding of the hub 11 at the end of each half-sleeve. A film is then applied to the inner face of the sleeve before establishing a vacuum in order to flatten the wall of this sleeve 14 against the corresponding faces of the autoclave.

A heating cycle is then begun in order to prepolymerize the impregnated resin in the layers 13 forming the hub and in the layers forming the sleeve 14. This heating cycle is adjusted to ensure a polymerization of the resin that is sufficient to give the mandrel 15 formed by the hub 11 and the sleeve 14 a sufficient mechanical strength to be handled for the purpose notably of applying to the outer face of this mandrel several layers of braided reinforcing fibres.

As can be seen in FIG. 4, the sleeve 14 has a generally tubular shape, but its end is advantageously designed to be flared so as to closely follow the approximately spherical outer shape of the hub 11 in the region in which it is secured to the end of the sleeve 14.

Other solutions can be applied to form the mandrel. For example, the sleeve 14 and the hub 11 may be manufactured and prepolymerized separately, before securing the end of the sleeve 14 to the hub 11 simply by bonding.

When the whole of the mandrel has been manufactured, a sealing test is advantageously carried out so as to ensure that it cannot traversed by resin injected around this mandrel, during a subsequent operation described below.

Once the whole mandrel 15 is formed and sufficiently rigid, several layers of braided reinforcing fibres are applied successively all around this mandrel and over the whole of its length by means of a braiding machine.

As shown in FIG. 5, the mandrel 15 is then installed in the braiding machine 17 which essentially comprises a ring 18 supporting at its rear face a series of fibre windings such as carbon fibres, supported by movable supports that can rotate relative to the ring. These fibres 19 join together in a region called the braiding point which is situated substantially on the axis AP while being offset along this axis relative to the plane of the supporting ring 18.

In the example of FIG. 5, the supporting ring 18 is centred on the axis AP, and extends along a plane normal to this axis. When the braiding cycle is begun, the mandrel 15 is moved along the axis AP relative to the supporting ring 18, which causes the braiding of a boot of fibres on the outer face of the mandrel 14.

Several passes are thus made to form several layers of braided fibres surrounding the mandrel 15 over the whole of its length, that is to say around the sleeve and around the hub, each layer having a substantially constant thickness.

Once the various layers of braided fibres have been applied, the part thus formed, which therefore comprises the mandrel surrounded by the various fibre layers, is placed in a mould such as a mould in two portions that are symmetrical with one another relative to a parting line. Each portion then comprises a semicylindrical portion corresponding to one half of the sleeve, and terminating in a recess in which one half of the hub 11 is housed.

The resin is then injected so as to completely impregnate the various layers of braided fibres and optionally the wound fibres of the hub, until it reaches the outer faces of the support 12 and of the sleeve 14 so as to ensure the best possible cohesion between the mandrel and these layers, in particular at the hub. This gives an optimal transmission of the forces applied to the hub 11, to the peripheral layers of braided fibres forming the body of the arm.

The sealing of the mandrel mentioned above ensures that the injected resin cannot penetrate the inside of the sleeve that is provided to be hollow in order to optimize the weight of the assembly. This seal is provided by the tubular support 12 and by the sleeve 14, the ends of the sleeve advantageously having been closed off before assembly with the hub 11.

After injection of the resin, the mould is controlled to carry out a curing cycle which ensures on the one hand the complete curing of the layers of braided composite material 21 surrounding the mandrel and which terminates moreover in the curing of the elements forming the mandrel, that is to say the sleeve and the hub.

Figure 6:
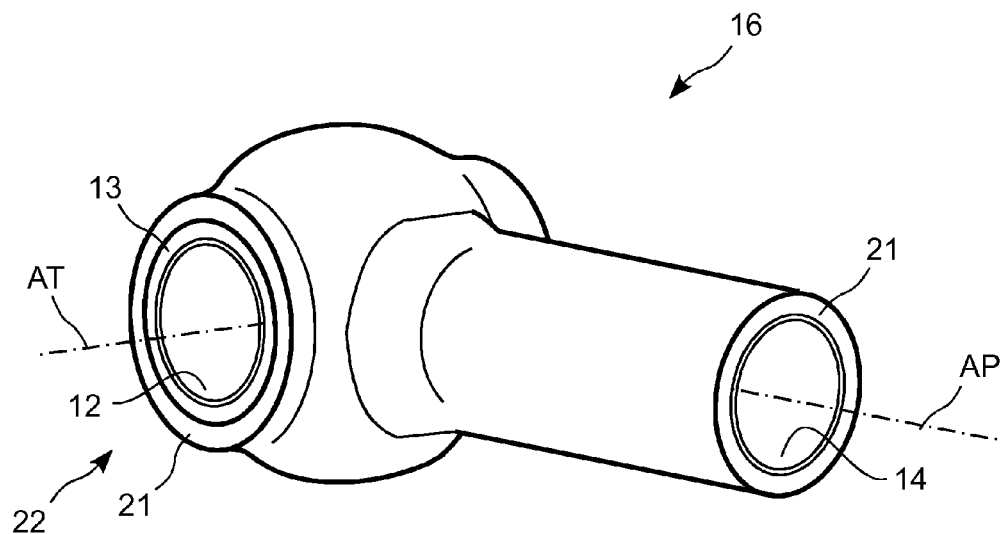
FIG. 6 is a view in perspective showing one end of the rocker arm incorporating a bearing while being manufactured according to the invention.

When the curing is complete, the hub and the layers of braided reinforcing fibres with the resin that binds the assembly form the main structure of the arm or rocker arm. The rough part thus obtained is then machined so as to give the bearing its final shape, as illustrated in FIG. 6.

These machinings consist essentially of two milling operations along the planes normal to the transverse axis AT, at the hub. These milling operations therefore consist in removing layers of reinforcing fibres in the regions situated facing each end of the tube 12 so that these ends are no longer closed off. Additionally, the ends of the connecting rod are also machined.

The inside of the tube 12 can also be bored in order to give it a precise internal diameter corresponding to a predefined tolerance dimension. Once the boring of the internal diameter of the tube 11 has been carried out, one or more metal rings may be installed inside this tube so as to accommodate the mechanical shaft passing through this bearing.

It should be noted that, in the example of the figures, the bearing is situated at one end of the arm, but the invention also makes it possible to produce in a similar manner an arm or a structural element having a bearing situated for example in its central region.

In this case, provision is made for example of two sleeves that are fitted on either side of the hub while being rigidly secured to the latter so as to form the mandrel. The two sleeves may be positioned so as to form an angle relative to one another so that the arm then has a bent shape, the bearing being situated in the bent zone while extending transversely relative to each sleeve.

If necessary, one or two other hubs may additionally be attached to the free ends of these two sleeves so as to form a structural element that may comprise two or three bearings.

The invention claimed is:

1. A method for manufacturing an arm (16) in composite material comprising at least one bearing (22) designed to receive a fixed or rotating shaft passing through the arm (16) transversely, this method comprising the steps of:
    manufacturing at least one hub (11) by winding reinforcing fibers around a generally tubular support (12);
    manufacturing at least one sleeve (14);
    manufacturing a mandrel (15) by attaching each hub (11) to at least one sleeve end so that each hub (11) extends transversely to each sleeve (14);
    applying one or more braided reinforcing fibers (21) around this mandrel (15) and over its whole length with a machine (17) for braiding reinforcing fibers (19);
    covering ends of the tubular support when applying a layer or layers of braided reinforcing fibers;
    injecting and polymerizing resin into a layer or a plurality of layers of braided fibers (21) and optionally into the wound fiber or fibers of the hub (11) in order to establish a cohesion rigidly binding at least the layer or the plurality of layers of braided fibers (21) with the hub (11) that they surround;
    removing the portions of the layer or layers of braided reinforcing fibers which cover each end of the tubular support in order to expose the ends of the tubular support; and
    machining the layer or the plurality of layers of braided reinforcing fibers (21) at each end of the generally tubular support (12) in order to clear each end of this support (12).

2. The method according to claim 1, in which each sleeve (14) is manufactured with pieces of fabric of reinforcing fibers preimpregnated with resin, in which the reinforcing fibers (13) wound around the generally tubular support (12) are also preimpregnated with resin, and in which the mandrel (15) is prepolymerized before application of the layers of braided reinforcing fibers (21).

3. The method according to claim 1, in which the reinforcing fibers are wound around the generally tubular support (12) so as to form a hub having a generally spherical outer shape.

4. The method according to claim 1, in which the generally tubular support (12) has a larger section in its central portion than at its ends.

5. The method according to claim 1, in which each sleeve end (14) is bonded to the hub (11).

6. The method according to claim 1, in which each sleeve has an end having a flared shape in order to closely follow the outer shape of the hub (11) to which this end is attached.

7. The method according to claim 1, in which the hub (11) is situated at one end of the mandrel (15).

8. The method according to claim 1, in which the mandrel is manufactured by assembling to the hub (11) two sleeves extending on either side of the hub (11).

\* \* \* \* \*